(No Model.)

C. H. DINKELMAN.
GYMNASTIC APPARATUS.

No. 447,811. Patented Mar. 10, 1891.

Witnesses.
Rufus J. Delano
Jesse H. Kertaugh

Inventor.
Christian H. Dinkelman

UNITED STATES PATENT OFFICE.

CHRISTIAN H. DINKELMAN, OF ST. LOUIS, MISSOURI.

GYMNASTIC APPARATUS.

SPECIFICATION forming part of Letters Patent No. 447,811, dated March 10, 1891.

Application filed December 23, 1890. Serial No. 375,583. (No model.)

*To all whom it may concern:*

Be it known that I, CHRISTIAN H. DINKELMAN, a citizen of the United States, residing in the city of St. Louis, State of Missouri, have invented a new and useful Gymnastic Apparatus, of which the following is a specification.

My invention relates especially to aerial gymnastic apparatus for use in circus-tents, theaters, or in the open air.

The object of my invention is to make the apparatus steady and strong and render it readily adjustable and quickly put up and taken down.

Figure 1:
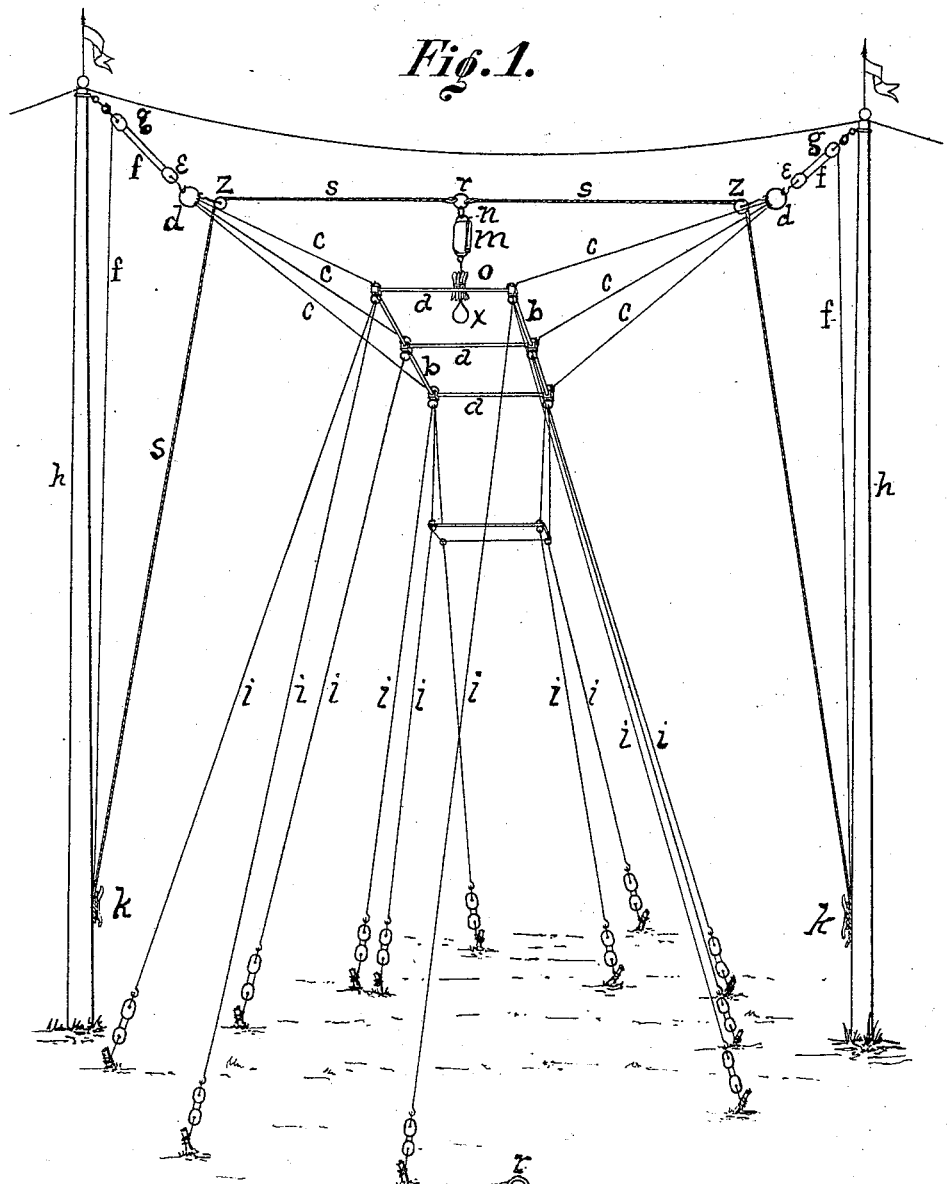
Figure 2:

In the accompanying drawings, illustrating my invention, Figure 1 is a perspective view of my improved gymnastic apparatus in position ready for use. Fig. 2 is a detail view of the devices which support and govern the descent of the performer when he leaps from the top of the apparatus to the ground.

As shown in the drawings, two poles $h$ are secured in the ground at a suitable distance apart. These poles may represent the ordinary center poles of a circus-tent. If the apparatus is to be used in a theater or similar room, the poles may be dispensed with and their places taken by the walls or any other suitable part of the building. Between the poles I have shown, in an elevated position, a frame consisting of three parallel bars $a$, firmly secured to the parallel side pieces $b$, which together constitute a rectangular frame. The performer acts on the bars $a$, the bars $b$ being used merely to hold the bars $a$ in place. The frame is suspended by means of wire ropes $c$. I have shown three such ropes on each side of the frame, secured at each end and midway between the ends of the frame, converging at their outer ends, and secured to the rings $d$ on opposite sides, as shown. These rings are in turn secured to a block-and-tackle apparatus consisting of pulleys $e$ $g$ and ropes $f$. The pulleys $g$ are secured to the upper ends of the posts $h$. The ropes $f$ extend over the pulleys $g$, pass to the bottom of the posts $h$, and are made fast on cleats $k$. By operating the ropes $f$ the parallel bars, ropes $c$, rings $d$, and pulleys $e$ may be raised and lowered at will. The parallel bars are steadied by guy-ropes $i$, descending to the ground and connected by block and tackle with stakes or with other suitable securing devices. By means of the guy-ropes and the ropes $f$ the parallel bars may be held at any desired elevation and made secure and steady, so that the performer may act with perfect safety.

It has not heretofore been found practicable to perform on parallel bars at any great distance above the ground or floor, especially where it was necessary to put up and take down the apparatus during the performance; but by my invention the apparatus may be put up and taken down rapidly, and when in position it is perfectly safe, and, consisting mainly of ropes, does not obstruct the view of the spectators.

In connection with the parallel bars I use what I term the "leap-for-life apparatus." After the actor has finished performing on the parallel bars, it is designed that he shall leap to the ground, which may be a distance of fifty feet or more, and in order to break the fall or prevent injury I have provided the apparatus which is shown in Fig. 1 above the bars and shown more in detail in Fig. 2.

Pulleys $z$ are secured to the rings $d$, and ropes $s$ extend over the pulleys, are secured to the cleats $k$, and are connected to a ring $r$ over the bars. An elastic band or spring $m$ is interposed between two half-rings or frame-pieces $n$. The upper frame-piece $n$ is connected with the ring $r$ and the lower frame-piece $n$ is connected with a rope $o$, which at its lower end is provided with a loop or handle $x$. As shown in the drawings, the rope is coiled up and held in a coil by a string $t$, which is readily broken by the weight of the performer. When the rope is straightened out, its lower end is some four or five feet above the floor or ground; but the weight of the performer descending with the rope causes the spring or elastic band $m$ to stretch. This breaks the fall and permits the performer to land on the ground or floor without injury. The leap-for-life apparatus may be raised and lowered by means of the ropes $s$.

I claim as my invention—

1. The combination, substantially as hereinbefore set forth, of the aerial parallel bars, the side pieces or bars to which they are secured, the adjustable guy-ropes extending downwardly therefrom, the ropes extending upwardly and outwardly from opposite sides thereof, the rings to which these ropes are secured, the block and tackle secured to the rings, and the cleats for making the adjusting-ropes of the tackle fast.

2. The combination, substantially as hereinbefore set forth, in the leap-for-life apparatus, of the coiled rope, a fastening device holding the coils together, an adjustable support above the rope, and a yielding or elastic band interposed between the rope and its support.

CHRISTIAN H. DINKELMAN.

Witnesses:
RUFUS J. DELANO,
JESSE J. H. KEEBAUGH.